United States Patent [19]
Redding

[11] 3,833,252
[45] Sept. 3, 1974

[54] FISH RETRIEVER
[76] Inventor: Donald E. Redding, P.O. Box 122, Sweet Home, Oreg. 97401
[22] Filed: Mar. 29, 1973
[21] Appl. No.: 346,098

[52] U.S. Cl................... 294/110 A, 43/5, 294/100
[51] Int. Cl............................................. A01k 97/14
[58] Field of Search............ 294/19 R, 26, 50.8, 61, 294/100, 110 A, 110 R, 115; 43/5, 6

[56] References Cited
UNITED STATES PATENTS

| | | | |
|---|---|---|---|
| 670,822 | 3/1901 | Sturman | 294/50.8 X |
| 1,171,440 | 2/1916 | Immell | 294/110 A |
| 1,578,711 | 3/1926 | Churchill | 294/110 A |
| 2,155,913 | 4/1939 | Thompson et al. | 294/110 A |
| 2,193,073 | 3/1940 | Norton | 294/100 |
| 2,584,881 | 2/1952 | Johnson et al. | 294/110 A |
| 3,312,496 | 4/1967 | Boutelle et al. | 294/66 R |
| 3,350,132 | 10/1967 | Ashton | 294/88 |

Primary Examiner—Richard A. Schacher
Assistant Examiner—Johnny D. Cherry
Attorney, Agent, or Firm—Eugene M. Eckelman

[57] ABSTRACT

A fish retriever having a pair of jaws which engage a fish from both sides with tip portions of the jaws piercing the fish. The jaws are operated by links pivotally connected and operated by a slide movable in a supporting body portion. The slide is powered by a spring or the like to forcefully close the jaws. Means are provided for opening the jaws so that they can be moved down over the fish. A trigger holds the slide in a cocked position, and when the slide is released the jaws grasp the fish.

1 Claim, 4 Drawing Figures

PATENTED SEP 3 1974 3,833,252

FISH RETRIEVER

BACKGROUND OF THE INVENTION

This invention relates to new and useful improvements in fish retrievers and particularly to a fish retriever capable of landing a fish after it has been brought in close by a hook and line.

Various types of fish retrievers have heretofore been proposed for landing fish. One such fish retriever is a net by means of which the fish is scooped from the water. Nets have serious disadvantages, however, one of which is that when they are brought down into the water in the area of the fish, they startle the fish and the latter often breaks free from the hook before it can be landed. Another disadvantage of a net is that in order to be effective it must be brought up from underneath or moved frontwise into the fish. This also results in many losses since the net will strike the line to tear the hook from the fish's mouth. Even when the net is successful in landing the fish, the fish and hooks are often entangled in the net so that it takes considerable time to remove the fish.

Another type of fish retriever is a gaff hook which comprises a hook type instrument not utilizing a barb on the end thereof. By means of this instrument, the fish is pierced on one side and attempted to be lifted for landing. Gaff hooks have the disadvantage, however, that they must be manipulated upwardly with such force that they pierce the fish. This is difficult for the average fisherman to do. Even though a gaff is properly operated, many fish are still lost because they slip off the gaff.

SUMMARY OF THE INVENTION

According to the present invention and forming a primary objective thereof, a fish retriever is provided having a pair of symmetrically operating jaws which can be opened in a cocked position and moved down over the fish from opposite sides and which are arranged when released to grasp the fish uniformally from both sides.

Another object is to provide a fish retriever of the type described employing an elongated body portion which houses a powered slide therein, the slide being connected to the jaws by a pair of pivoted links and arranged to open the jaws when retracted and to forcefully close the jaws when driven down.

Still another object is to provide a fish retriever which takes the fight out of the fish so that the fish can be easily landed.

The invention will be better understood and additional objects and advantages will become apparent from the following description taken in connection with the accompanying drawings.

DETAILED DESCRIPTION OF PREFERRED EMBODIMENTS

Figure 1:
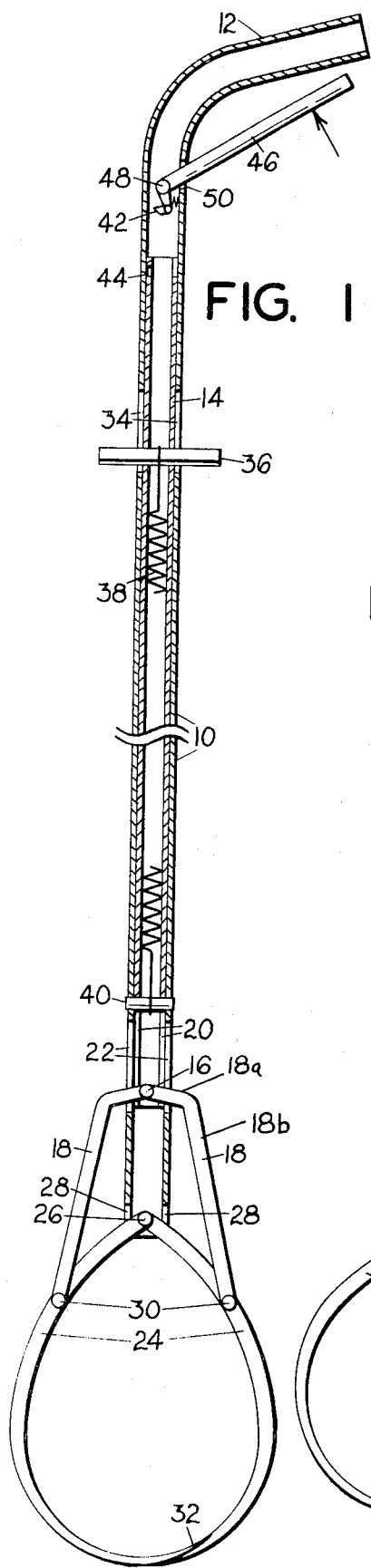
FIG. 1 is a foreshortened longitudinal sectional view of a fish retriever embodying features of the invention, the retriever jaws being shown in a closed position.
Figure 2:
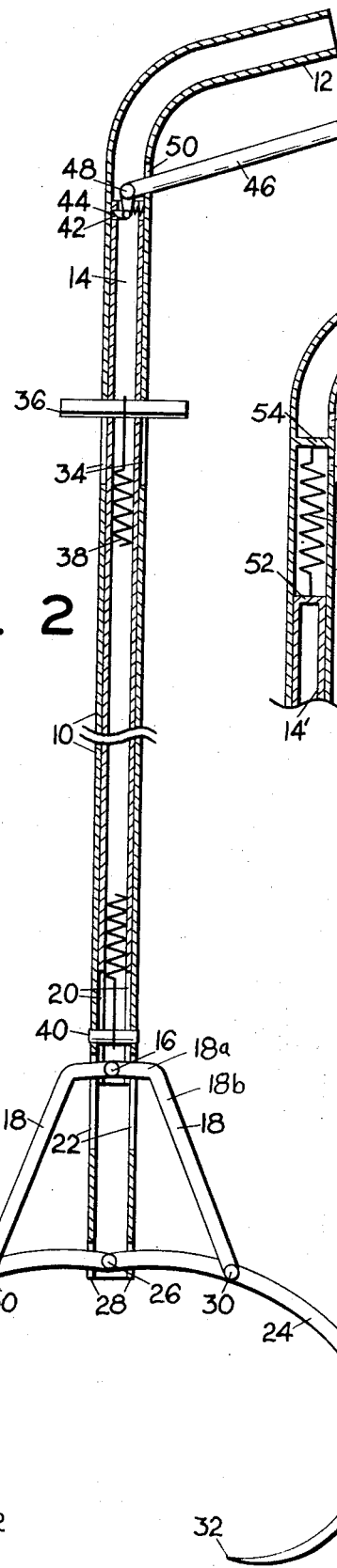
FIG. 2 is a view similar to FIG. 1 except that the jaws are shown in open position.

With particular reference first to FIGS. 1 and 2, a fish retriever of the invention comprises a tubular body portion 10 which curves to one side at the top to form a handle 12. Movable within the body portion 10 is a tubular slide 14 the bottom end of which terminates above the bottom of body portion 10. The slide 14 pivotally supports adjacent to the bottom thereof, by means of pivot pin 16, a pair of oppositely directed links 18 which extend through and work in opposed slots 20 in the slide 14 as well as in opposed slots 22 in the body portion. Links 18 are angle shaped, having two portions 18a and 18b which extend at obtuse angles to each other.

A pair of jaws 24 are pivotally connected at their upper ends, by a pivot pin 26, to the lower end of body portion 10, such body portion having opposed slots 28 through which the jaws extend. The jaws are pivotally connected to the lower ends of links 18 by pivot pins 30. The pivot connections 30 are intermediate the ends of the jaws, and the arrangement is such that upon upward movement of the slide 14, the jaws open to the position shown in FIG. 2.

The jaws are arcuate in configuration and as shaped, FIG. 1, are arranged to clamp a fish uniformly from both sides with the tips 32 of the jaws arranged to pierce the lower or belly portion of the fish. The tips 32 are sharpened and in the closed position of the jaws, they overlap a considerable amount.

Secured transversely through the slide member 14 at an upper portion thereof and projecting through opposed slots 34 in the body portion 10 is a grip member 36. A tension spring 38 is connected between this grip member and an anchor pin 40 secured to a lower portion of the housing 10. To move the jaws to their FIG. 2 or open position, the operator pulls up on the grip member 36. This moves the slide 14 as well as the links 18 upward to cause such jaw opening function. A spring operated latch 42 is disposed at the upper end of body portion 10 and is arranged for engagement with a notch 44 in the slide to hold the latter up. The latch 42 is operated by a trigger 46 pivotally connected to the body portion 10 by means of a pivot pin 48. The trigger projects through a suitable opening 50 in the body portion and extends parallel to and just below the handle 12 for easy manipulation by the operator.

When the present fish retriever is not in use, the slide 14 is disengaged from the latch 42 and is held in its lowered position by the spring with the jaws 24 closed. However, to retrieve a fish, the operator pulls upwardly on the grip member 36 until the slide latches in its upward position by engagement of latch means 42 in notch 44. With the jaws open, the operator manipulates the device down over the fish such that the jaws are disposed on opposite sides of the fish. When properly located, the trigger 46 is pulled to release the slide 14. The power of the spring 38 closes the jaws on the fish. As the jaws close, they grip the fish on the sides and the points 32 pierce the lower or belly portion of the fish. The operator can then lift the fish upwardly into the boat.

The fish is released simply by pulling upwardly on the grip member 36.

Figure 3:
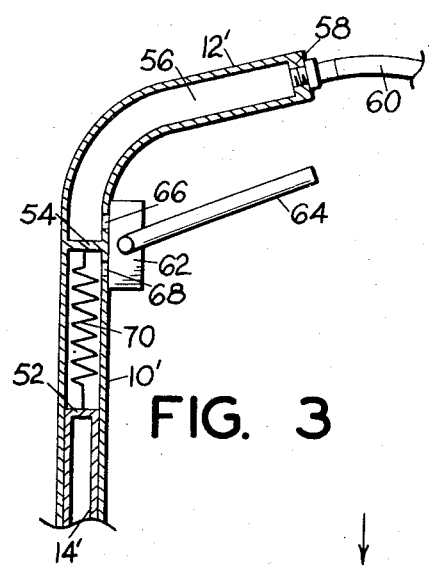
FIG. 3 is a fragmentary sectional view of a modified structure.
Figure 4:
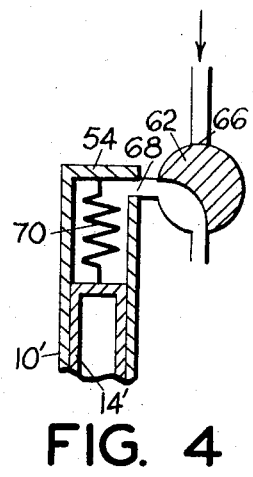
FIG. 4 is a diagrammatic view of valve control means for the embodiment of FIG. 3.

FIGS. 3 and 4 illustrate a modified drive means for a slide 14. The structure of the lower portion of the body portion 10' is identical to that of the structure shown in FIGS. 1 and 2, the only difference being that the slide member in FIGS. 3 and 4 is powered by compressed air rather than by a spring. For this purpose, the upper end 52 of slide 14' is closed to serve as a piston head. The body portion 10' has a plug 54 above the slide which serves as the bottom of a compressed air compartment 56 in the handle closed at its upper end at 58 and having suitable connecting means with an air supply hose 60.

A valve 62 is secured exteriorly on the handle 10' at the plug 54 and has an operating lever 64 which extends parallel to the handle portion 12' for easy operation. A pair of ports 66 and 68 are provided in the handle portion and are arranged on opposite sides of the plug 54. The valve 62 in one position directs a charge of air from the compartment 56 into the handle portion between the slide 14' and the plug 54 and in its other position, shown in FIG. 4, relieves the area above the slide 14' to atmosphere.

A tension spring 70 is connected between the slide 14' and the plug 54 and pulls the slide 14' upwardly to an open position of the jaws.

In the operation of the embodiment of FIGS. 3 and 4, the trigger 64 is normally in a position wherein the area of the handle above the slide 14' is vented to atmosphere as in FIG. 4. This allows the spring 70 to pull the jaws upwardly. When the operator pulls upwardly on the trigger 64, communication is established through the valve between the compartment 56 and the area above the slide 14'. The charge of air in the compartment 56 drives the slide downwardly to clamp the jaws on a fish. The jaws will remain closed until the trigger 64 is released. The embodiment of FIG. 3 illustrates the use of compressed air, but it is to be understood that other drive means, such as a CO2 cartridge may be used.

In accordance with the present invention, a fish retriever is provided which comprises a substantial improvement over the usual net or gaff hook. The present structure requires merely for the operator to place the device down over the fish with the jaws open and to trip the lever wherein the fish is immediately and positively caught. It has been found that with the jaws shaped substantially to the shape of a fish and the tip ends thereof overlapping a substantial amount to pierce the fish at its lower or belly portion, the fish will not struggle as it does on a conventional gaff hook or in a net. Once the fish is caught in the jaws, it can be readily lifted into the boat and also readily released merely by operating the grip lever 36. As opposed to a net, the present device does not scare the fish as it is being placed in a position to grasp the fish. Furthermore, the device is readily manipulated without causing accidental dislodgment of the hook from the mouth of the fish or breaking the line.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. A fish retriever comprising
   a. an elongated tubular body portion having upper and lower ends,
   b. said body portion having an angularly extending portion at its upper end forming a handle,
   c. a pair of opposed sharpened jaws pivotally supported on said lower end of the body portion and arranged for movement between an open position for partially encircling a fish and a closed position for piercing opposite sides of the fish,
   d. said jaws having a pivotal movement such that in their closed position the sharpened ends thereof overlap in side by side relation,
   e. a tubular slide having guided longitudinal movement in said body portion,
   f. said body portion having diametral slots disposed upwardly from its lower end,
   g. a pair of links extending through said slots and having a pivotal connection at one of their ends to said slide and a pivotal connection at their other ends to respective jaws whereby said jaws are opened upon upward movement of said slide in the body portion nd closed upon downward movement of said slide,
   h. tension spring means disposed interiorly of said slide,
   i. said spring means being anchored at its lower end to said body portion and at its upper end to said slide and urging said slide downward in a force sufficient to cause said jaws to pierce a fish with said sharpened ends in overlapping relation,
   j. a laterally extending grip member secured to said slide for manually moving the latter upwardly,
   k. said body member having diametral slots through which said grip member extends,
   l. interengaging catch means at the upper end of said body portion and slide arranged to hold the latter in an upper cocked position,
   m. and a trigger on said body portion having one end portion arranged to operate said catch means and having its other end portion extending outwardly adjacent to said handle and substantially parallel therewith for engagement by the same hand of the operator that grips the handle.

* * * * *